US008614670B2

(12) United States Patent
Nakaoka

(10) Patent No.: US 8,614,670 B2
(45) Date of Patent: *Dec. 24, 2013

(54) INPUT DEVICE AND DATA PROCESSING SYSTEM

(75) Inventor: Yasushi Nakaoka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 887 days.

This patent is subject to a terminal disclaimer.

(21) Appl. No.: 12/638,153

(22) Filed: Dec. 15, 2009

(65) Prior Publication Data

US 2010/0156788 A1 Jun. 24, 2010

(30) Foreign Application Priority Data

Dec. 18, 2008 (JP) ................................. 2008-321908

(51) Int. Cl.
*G06F 3/033* (2006.01)
(52) U.S. Cl.
USPC ............ 345/158; 345/156; 345/157; 715/740
(58) Field of Classification Search
None
See application file for complete search history.

(56) References Cited

U.S. PATENT DOCUMENTS

| 5,453,758 | A | 9/1995 | Sato |
| 5,598,187 | A | 1/1997 | Ide et al. |
| 6,082,197 | A | 7/2000 | Mizuno et al. |
| 8,330,716 | B2 * | 12/2012 | Nakaoka ........................ 345/157 |
| 2004/0100441 | A1 | 5/2004 | Rekimoto et al. |
| 2005/0212759 | A1 * | 9/2005 | Marvit et al. .................. 345/156 |
| 2007/0273645 | A1 * | 11/2007 | Bang et al. .................... 345/157 |
| 2008/0015031 | A1 | 1/2008 | Koizumi et al. |
| 2008/0291163 | A1 * | 11/2008 | Liberty ........................... 345/156 |
| 2009/0126490 | A1 | 5/2009 | Sameshima |
| 2009/0299142 | A1 | 12/2009 | Uchiyama et al. |
| 2010/0156788 | A1 | 6/2010 | Nakaoka |
| 2010/0218024 | A1 * | 8/2010 | Yamamoto et al. ........... 713/324 |

FOREIGN PATENT DOCUMENTS

| EP | 0625744 A1 | 11/1994 |
| JP | 06-311564 A | 11/1994 |
| JP | 07-028591 A | 1/1995 |
| JP | 2001-56743 A | 2/2001 |
| JP | 2002-207567 A | 7/2002 |
| JP | 2003-240542 A | 8/2003 |
| JP | 2007-052696 A | 3/2007 |
| JP | 2007-079673 A | 3/2007 |
| JP | 2007-296173 A | 11/2007 |
| JP | 2007-317193 A | 12/2007 |
| JP | 2007-535776 A | 12/2007 |
| JP | 2008-123158 A | 5/2008 |
| WO | 2005/108119 A2 | 11/2005 |
| WO | 2008-099851 A | 8/2008 |

* cited by examiner

*Primary Examiner* — Lixi C Simpson
(74) *Attorney, Agent, or Firm* — Global IP Counselors, LLP

(57) ABSTRACT

An input device includes a main body, a motion sensor unit and a coordinate conversion processing unit. The coordinate conversion processing unit configured to perform coordinate conversion processing based on a Y-axis acceleration and a Z-axis acceleration detected by the motion sensor unit with a first two-dimensional orthogonal coordinate system being defined by a mutually orthogonal Y-axis and Z-axis in a first plane perpendicular to an X-axis coinciding with a pointing direction of the main body. The coordinate conversion processing unit is configured to convert the Y-axis angular velocity and the Z-axis angular velocity detected by the motion sensor unit to a U-axis angular velocity and a V-axis angular velocity, respectively, in a second two-dimensional orthogonal coordinate system defined by a U-axis corresponding to a horizontal axis in the first plane and a V-axis perpendicular to the U-axis in the first plane.

8 Claims, 10 Drawing Sheets

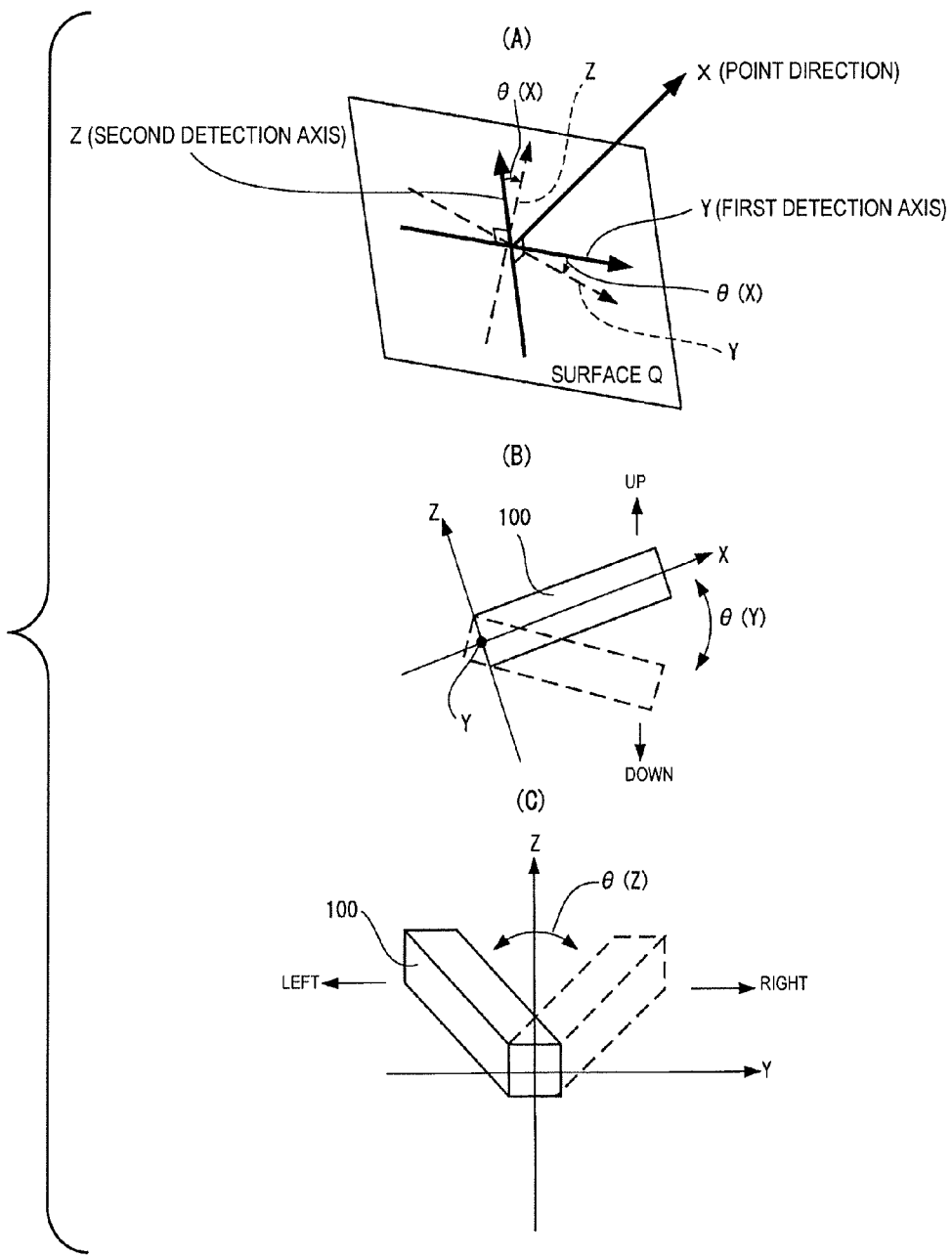
F I G. 2

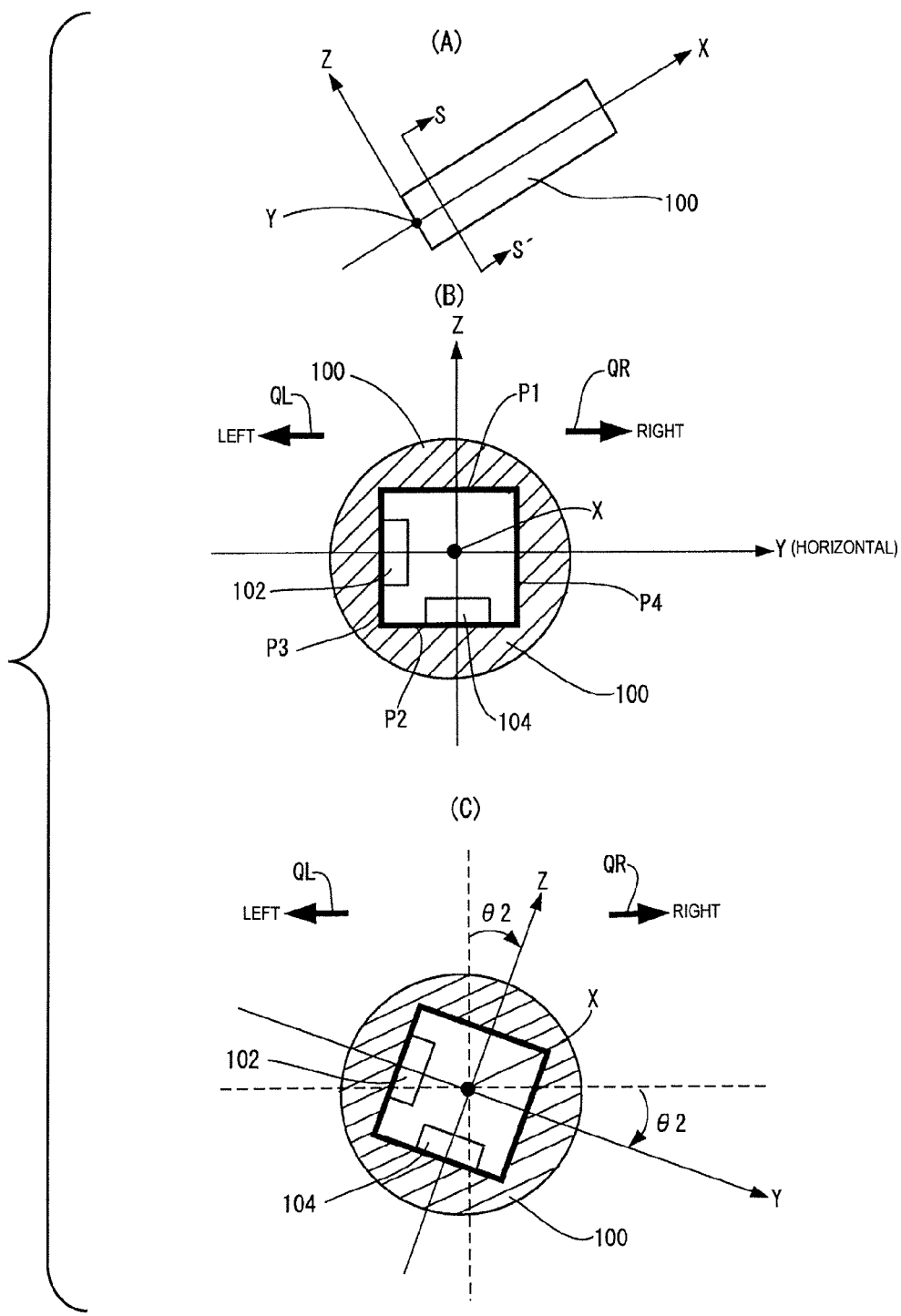
F I G. 3

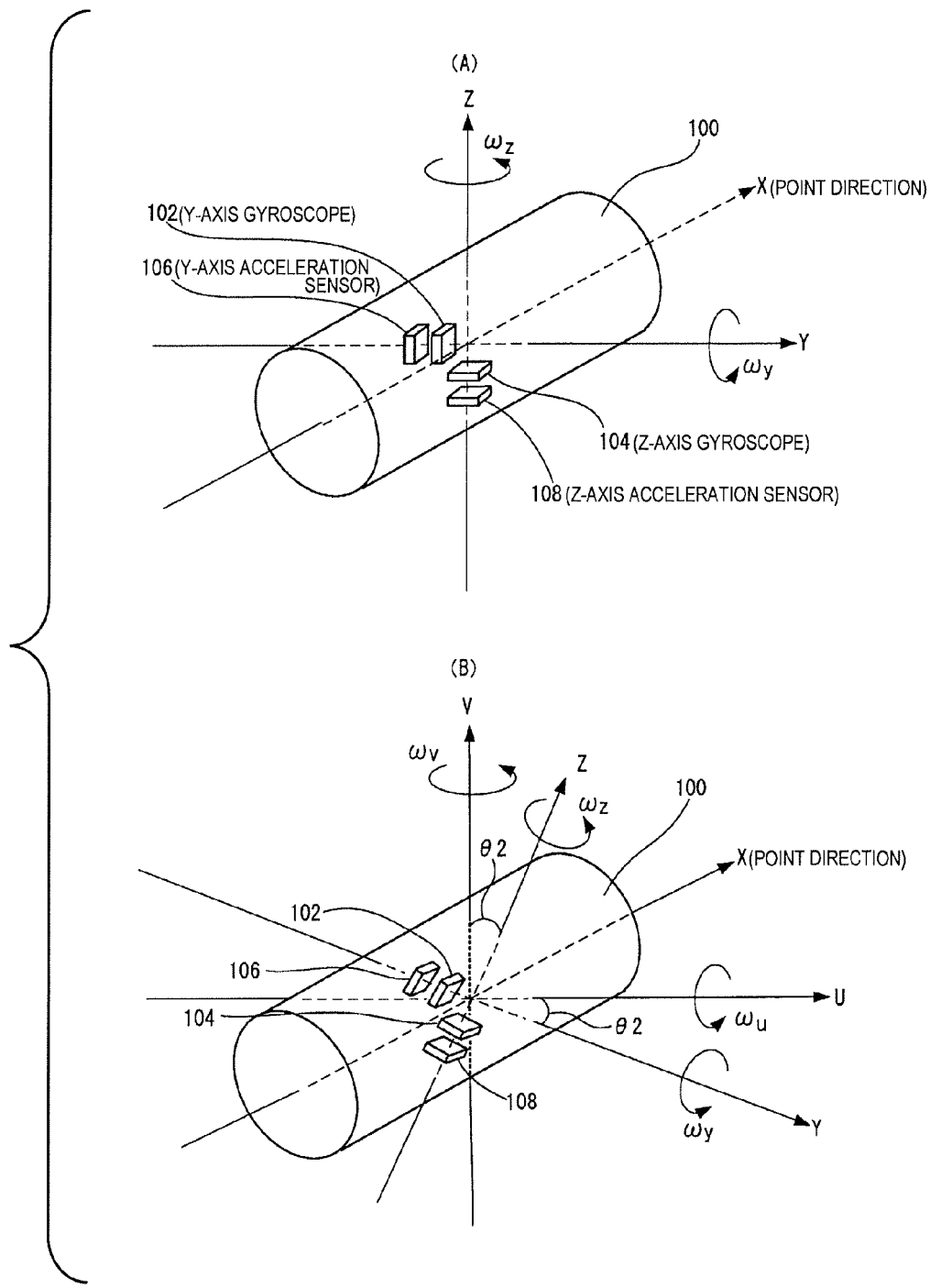
F I G. 4

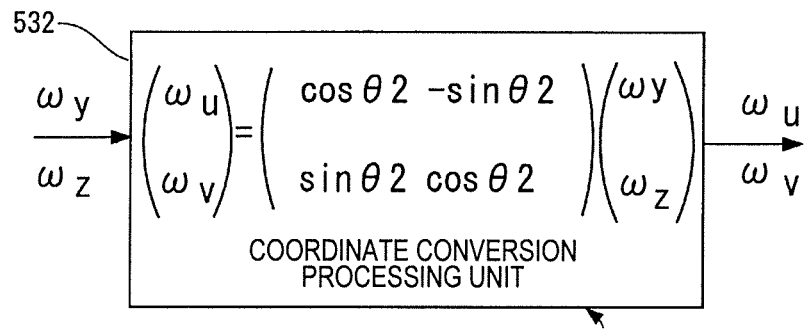

$$\omega_u = \omega_y \cos\theta 2 - \omega_z \sin\theta 2 \quad \text{---(4)}$$

$$\omega_v = \omega_y \sin\theta 2 + \omega_z \cos\theta 2 \quad \text{---(5)}$$

$$\omega_u = \frac{\omega_y \overbrace{(G1\cos\theta 2)}^{\gamma_z} - \omega_z \overbrace{(G1\sin\theta 2)}^{\gamma_y}}{G1} \quad \text{---(6)}$$

$$\omega_v = \frac{\omega_y \overbrace{(G1\sin\theta 2)}^{\gamma_y} + \omega_z \overbrace{(G1\cos\theta 2)}^{\gamma_z}}{G1} \quad \text{---(7)}$$

$$G1 = \sqrt{\gamma_y^2 + \gamma_z^2} = \sqrt{G1^2 \underbrace{(\sin^2\theta + \cos^2\theta)}_{1}} \quad \text{---(8)}$$

$$\omega_u = \frac{\omega_y \gamma_z - \omega_z \gamma_y}{\sqrt{\gamma_y^2 + \gamma_z^2}} \quad \text{---(1)}$$

$$\omega_v = \frac{\omega_y \gamma_y + \omega_z \gamma_z}{\sqrt{\gamma_y^2 + \gamma_z^2}} \quad \text{---(2)}$$

F I G. 5

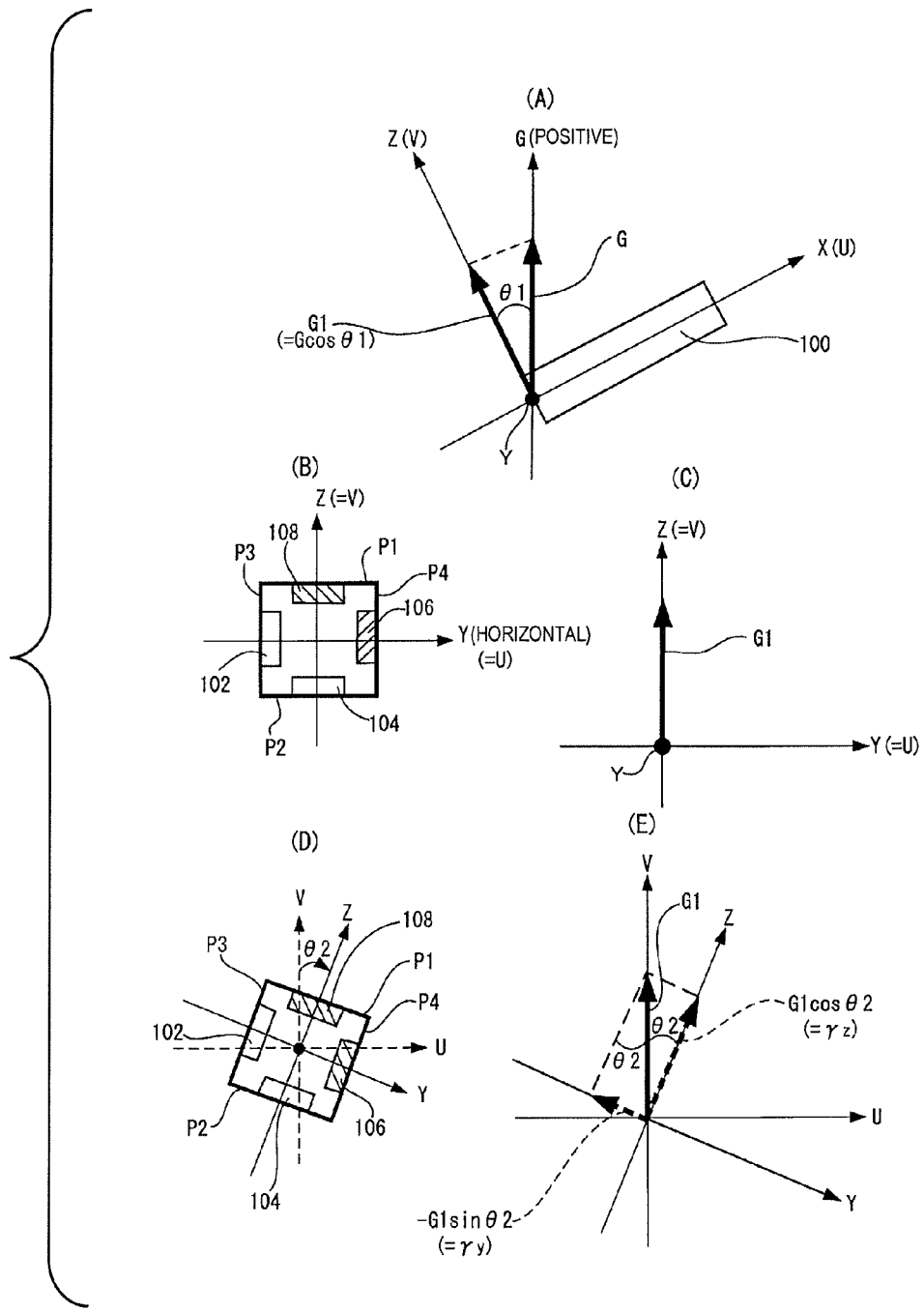
F I G. 6

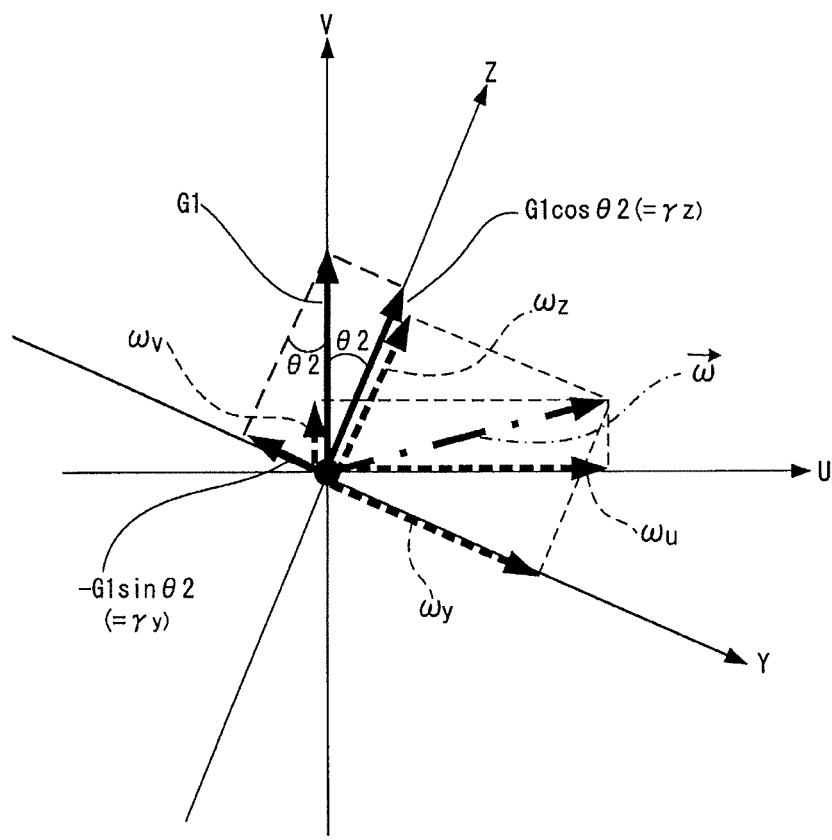
F I G. 7

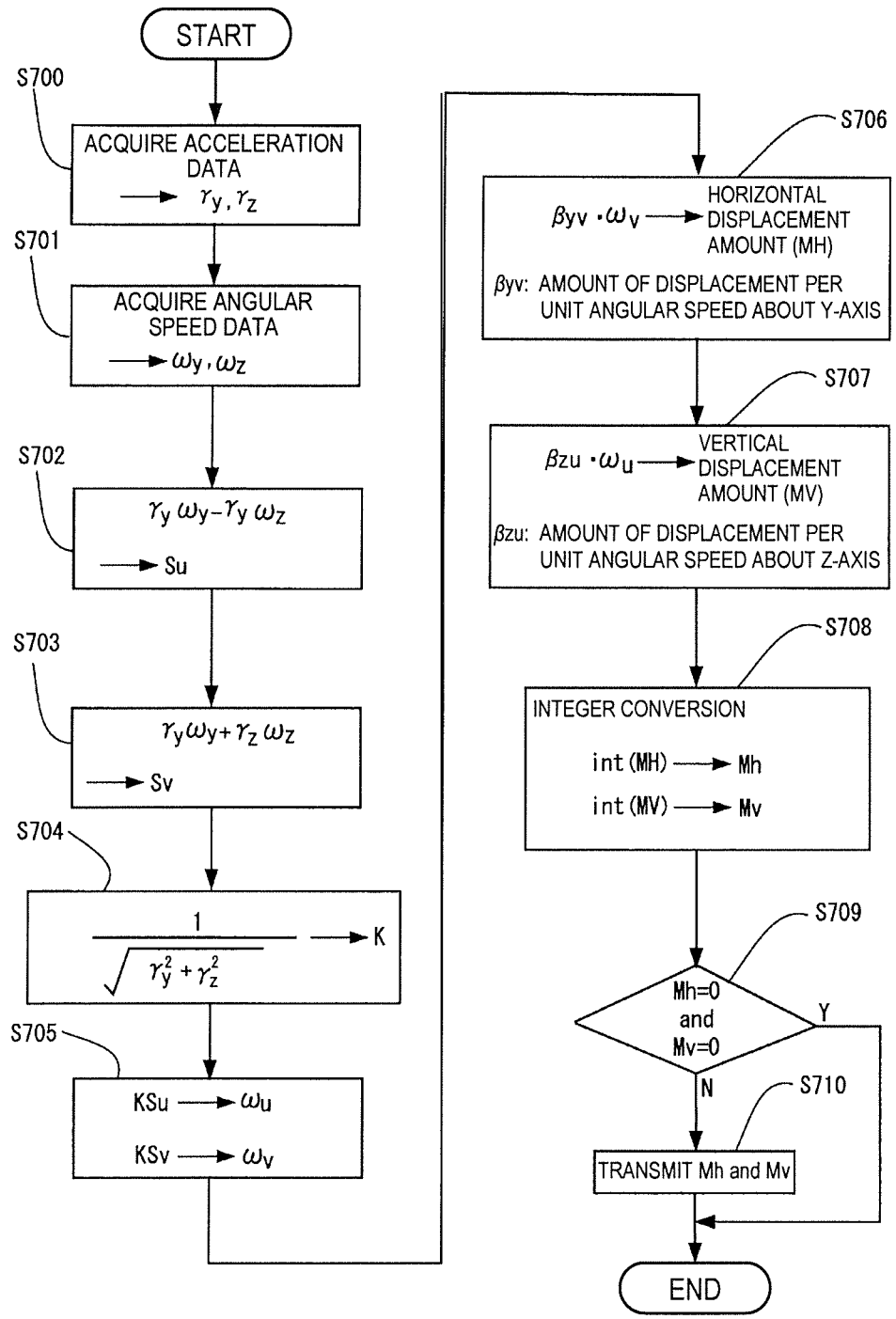
F I G. 9

INPUT DEVICE AND DATA PROCESSING SYSTEM

CROSS-REFERENCE TO RELATED APPLICATIONS

This application claims priority to Japanese Patent Application No. 2008-321908 filed on Dec. 18, 2008. The entire disclosure of Japanese Patent Application No. 2008-321908 is hereby incorporated herein by reference.

BACKGROUND

1. Technical Field

The present invention relates to an input device and to a data processing system and the like.

2. Related Art

The need has recently increased for a system that utilizes an input device for generating and outputting a physical quantity signal in accordance with the movement (including at least one of the orientation (including rotation) of a main body and the movement (including translational movement) of a main body) of a main body (housing) in space (e.g., a three-dimensional mouse or the like).

Japanese Laid-Open Patent Publication No. 2001-56743, for example, discloses a technique that utilizes a button-operated device in which a cursor pointer is moved on an image display device by movement of a mobile device in three-dimensional space (a three-dimensional mouse).

Japanese Laid-Open Patent Publication No. 2001-56743 discloses an input device (pointing device) in which rotational motion in two axes (Y-axis, Z-axis) is detected using two gyroscopes or gyro sensors (angular velocity sensors), and the detection signal is sent in an unaltered form to a control device as operation information. This input device can be used instead of a pointing rod or a laser pointer. For example, when a user holding the input device in their hand waves the distal end of the main body (housing) of the input device to the left or right, the position of a cursor on a display unit, for example, moves correspondingly left or right.

SUMMARY

In the input device (pointing device) disclosed in Japanese Laid-Open Patent Publication No. 2001-56743, no consideration is made regarding rotation of the housing about the pointing direction axis (point direction axis). A case is assumed in which the input device has the external appearance of a cylinder, and the input device is used instead of a laser pointer, for example.

For example, when a user gives a presentation while using the input device to point to characters or shapes on a display or screen, the user may unconsciously rotate the handheld cylindrical input device (main body) slightly about the pointing direction axis (point direction axis: the X-axis in this instance).

The two gyroscopes (angular velocity sensors) detect angular velocity of rotation about the Y-axis and the Z-axis (i.e., the detection axes). Since each gyroscope is fixed to a flat surface (e.g., an internal wall surface of the housing) provided to the main body of the input device, for example, when the main body (housing) of the input device rotates about an axis (X-axis) other than the detection axes (Y-axis, Z-axis), the Y-axis and Z-axis also rotate, and the position of each gyroscope (angular velocity sensor) varies as a result.

Consequently, even though the same movement occurs at the distal end of the main body of the input device, a difference occurs between the angular velocity detected in a state in which there is no rotation about the X-axis and the angular velocity detected in a state in which there is rotation about the X-axis. Specifically, a detection error occurs due to rotation of the main body (housing) about the axis (X-axis) other than the detection axes (Y-axis, Z-axis).

Rotation of the main body (housing) about the axis (X-axis) other than the detection axes (Y-axis, Z-axis) preferably does not occur, and in order to prevent such rotation, the user must constantly be aware so as not to rotate the main body of the input device. In this case, the operating properties of the input device are adversely affected. Particularly when a button, touch sensor, or the like that is necessary for operation is provided to the main body of the input device, the limitation described above makes it impossible for the user to hold the device in a manner that enables easy operation, and the user is forced to hold the device in an inconvenient manner. This drawback places a burden on the user.

As the user holds and operates the main body of the input device, some unwanted and unintentional rotation of the main body is unavoidable during actual use. There is therefore a need to improve the operating properties of a three-dimensional input device.

Through at least one embodiment of the present invention, rotation about a detection axis can be detected with high precision regardless of the manner in which the main body (housing) is held by the user. Consequently, an input device (e.g., three-dimensional pointing device, three-dimensional mouse, or the like) can be provided that has similar operating properties to a pointing rod or laser pointer, for example.

An input device according to one aspect of the present invention includes a main body, a motion sensor unit and a coordinate conversion processing unit. The motion sensor unit is configured and arranged to generate a physical quantity signal corresponding to movement of the main body in a first two-dimensional orthogonal coordinate system defined by a mutually orthogonal Y-axis and Z-axis in a first plane perpendicular to an X-axis that coincides with a pointing direction of the main body. The motion sensor unit includes a Y-axis angular velocity sensor, a Z-axis angular velocity sensor, a Y-axis acceleration sensor and a Z-axis acceleration sensor. The Y-axis angular velocity sensor is configured and arranged to detect an angular velocity of the main body about the Y-axis. The Z-axis angular velocity sensor is configured and arranged to detect an angular velocity of the main body about the Z-axis. The Y-axis acceleration sensor is configured and arranged to detect an acceleration of the main body in a Y-axis direction. The Z-axis acceleration sensor is configured and arranged to detect an acceleration of the main body in a Z-axis direction. The coordinate conversion processing unit is configured to perform coordinate conversion processing based on the Y-axis acceleration detected by the Y-axis acceleration sensor and the Z-axis acceleration detected by the Z-axis acceleration sensor. The coordinate conversion processing unit is configured to convert the Y-axis angular velocity detected by the Y-axis angular velocity sensor and the Z-axis angular velocity detected by the Z-axis angular velocity sensor to a U-axis angular velocity and a V-axis angular velocity, respectively, in a second two-dimensional orthogonal coordinate system defined by a U-axis corresponding to a horizontal axis in the first plane and a V-axis perpendicular to the U-axis in the first plane.

In the present aspect, an X-axis is defined that coincides with the pointing direction (point direction) of the main body of the input device, and a two-dimensional first orthogonal coordinate system is defined by a Y-axis and Z-axis orthogonal to each other in a first plane that is perpendicular to the X-axis. The motion sensor unit provided to the input device detects movement in the three-dimensional space of the input device (main body of the input device) based on the first orthogonal coordinate system.

Specifically, the Y-axis angular velocity sensor detects the angular velocity of rotation about the Y-axis as the detection axis thereof. The Z-axis angular velocity sensor detects the angular velocity of rotation about the Z-axis as the detection axis thereof. Each angular velocity sensor is fixed to a flat surface (e.g., internal wall surface of the housing) provided to the main body of the input device, for example, and when the main body (housing) of the input device rotates about the axis (X-axis) other than the detection axes (Y-axis, Z-axis), the Y-axis and Z-axis also rotate. As described above, a measurement error is included in the angular velocity detected by each angular velocity sensor in a state in which there is unwanted rotation about the X-axis.

In the present aspect, a two-dimensional second orthogonal coordinate system is defined by a U-axis that is the horizontal axis in the first plane perpendicular to the X-axis, and a V-axis that is an axis perpendicular to the U-axis in the first plane, the X-axis coinciding with the pointing direction of the main body. The U-axis is a horizontal axis in the first plane, and the V-axis is a vertical axis orthogonal to the U-axis in the first plane. The U-axis and the V-axis are each uniquely defined by specifying the pointing direction (point direction) of the main body, and are not affected by rotation of the input device about the X-axis.

In the present aspect, the coordinate conversion processing unit executes a coordinate conversion (rotation coordinate conversion) from the first orthogonal coordinate system to the second orthogonal coordinate system, and converts the Y-axis angular velocity detected by the Y-axis angular velocity sensor, and the Z-axis angular velocity detected by the Z-axis angular velocity sensor to a U-axis angular velocity and a V-axis angular velocity, respectively. The detected angular velocities (including the measurement error that accompanies rotation when rotation about the X-axis occurs) are thereby corrected to the angular velocities for a state in which there is no rotation of the main body about the X-axis.

The rotation angle between the X-axis (Y-axis) and the U-axis (V-axis) in the first plane orthogonal to the X-axis must be detected in order for coordinate axis conversion (rotation coordinate conversion) to be executed. Therefore, in the present aspect, a Y-axis acceleration sensor is provided in addition to the Y-axis angular velocity sensor as a physical quantity measurement device for the Y-axis as the detection axis, and a Z-axis acceleration sensor is provided in addition to the Z-axis angular velocity sensor as a physical quantity measurement device for the Z-axis as the detection axis. When the main body (housing) of the input device rotates about the X-axis, which is the pointing direction axis, the acceleration detected for the Y-axis and the acceleration detected for the Z-axis each vary according to the rotation angle. Specifically, the Y-axis acceleration and the Z-axis acceleration are expressed by an equation that includes the rotation angle in the first plane as a parameter (variable). Rotation angle information can thus be obtained when the Y-axis acceleration and the Z-axis acceleration can be detected. The Y-axis angular velocity and the Z-axis angular velocity can be converted to a U-axis angular velocity and a V-axis angular velocity by executing rotation coordinate conversion based on the obtained rotation angle information.

Through the present aspect, rotation about the detection axis can be detected with high precision regardless of the manner in which the main body (housing) is held by the user. Consequently, an input device (e.g., three-dimensional pointing device, three-dimensional mouse, or the like) can be provided that has more similar operating properties to a pointing rod or laser pointer, for example.

In the input device according to another aspect of the present invention, the coordinate conversion processing unit is configured to convert the Y-axis angular velocity and the Z-axis angular velocity to the U-axis angular velocity and the V-axis angular velocity, respectively, according to Equations (1) and (2) below.

Equations (1) and (2)

$$\omega_u = \frac{\omega_y \gamma_z - \omega_z \gamma_y}{\sqrt{\gamma_y^2 + \gamma_z^2}} \quad (1)$$

$$\omega_v = \frac{\omega_y \gamma_y + \omega_z \gamma_z}{\sqrt{\gamma_y^2 + \gamma_z^2}} \quad (2)$$

In Equations (1) and (2), $\omega_u$ represents the U-axis angular velocity, $\omega_v$ represents the V-axis angular velocity, $\omega_y$ represents the Y-axis angular velocity, $\omega_z$ represents the Z-axis angular velocity, $\gamma_y$ represents the Y-axis acceleration, and $\gamma_z$ represents the Z-axis acceleration.

Coordinate conversion is generally performed by a combination of parallel movement and rotation. In the present aspect, it is sufficient if only rotation about the X-axis is considered. Rotation coordinate conversion can be performed through the use of a matrix operation. When the angle formed by the Y-axis (Z-axis) and the U-axis (V-axis) in the first plane is designated as θ2, the matrix operation according to Equation (3) below may be performed in order to convert the Y-axis angular velocity $\omega_y$ and the Z-axis angular velocity $\omega_z$ to the U-axis angular velocity $\omega_u$ and $\omega_v$, respectively, wherein $\gamma_y$ is the Y-axis acceleration, $\gamma_z$ is the Z-axis acceleration, $\omega_y$ is the Y-axis angular velocity, and $\omega_z$ is the Z-axis acceleration. Equation (4) and Equation (5) below are thus established.

Equations (3) to (5)

$$\begin{pmatrix} \omega_u \\ \omega_v \end{pmatrix} = \begin{pmatrix} \cos\theta 2 & -\sin\theta 2 \\ \sin\theta 2 & \cos\theta 2 \end{pmatrix} \begin{pmatrix} \omega_y \\ \omega_z \end{pmatrix} \quad (3)$$

$$\omega_u = \omega_y \cos\theta 2 - \omega_z \sin\theta 2 \quad (4)$$

$$\omega_v = \omega_y \sin\theta 2 + \omega_z \cos\theta 2 \quad (5)$$

Gravitational acceleration (in the vertical direction) is designated as G. Specifically, in a weightless state (e.g., in a state in which an object is placed in outer space or the like), the output of an acceleration sensor is zero. In the same manner, since a weightless state occurs inside an object in free fall, the output of an acceleration sensor is zero. On the other hand, an object in free fall on Earth is accelerating downward at 1 G (−1 G upward). The following relationship is also established: (Acceleration sensor output)=(Acceleration state of the object)−(1 G downward). Consequently, when the object is static, the output of the acceleration sensor is equal to 0−(1 G downward)=(1 G upward). When the angle θ1 is formed by the vertical axis (G-axis) and the first plane, the component of the gravitational acceleration (straight upward) G that is in the V-axis (which coincides with the Z-axis in a state in which there is no rotation about the X-axis), which is the perpendicular axis in the first plane, is designated as G1 (=G cos θ1). A case is assumed in which the Z-axis (Y-axis) and V-axis (U-axis) form a rotation angle θ2 in the first plane as a result of the main body being rotated θ2 about the X-axis.

At this time, the component in which the gravitational acceleration G is projected onto the Z-axis in the first plane (i.e., the Z-axis acceleration $\gamma_z$) is G1 cos θ2, and in the same manner, the component in which the gravitational acceleration (straight upward) is projected onto the Y-axis in the first plane (i.e., the Y-axis acceleration $\gamma_y$) is G1 sin θ2. As is apparent, the Y-axis acceleration $\gamma_y$ and the Z-axis acceleration $\gamma_z$ include the information of the rotation angle θ2 about the X-axis. Consequently, the computations according to Equations (4) and (5) above can be executed by detecting the Z-axis acceleration $\gamma_z$ and the Y-axis acceleration $\gamma_y$. Specifically, Equations (4) and (5) can be transformed into Equations (6) and (7), respectively. Moreover, G1 can be indicated as shown in Equation (8) below.

Equations (6) to (8)

$$\omega_u = \frac{\omega_y G1\cos\theta 2 - \omega_Z G1\sin\theta 2}{G1} \quad (6)$$

$$\omega_v = \frac{\omega_y G1\sin\theta 2 + \omega_Z G1\cos\theta 2}{G1} \quad (7)$$

$$G1 = \sqrt{G1^2(\sin^2\theta + \cos^2\theta)} = \sqrt{\gamma_y^2 + \gamma_z^2} \quad (8)$$

By substituting Equation (8) into the denominators of Equations (6) and (7), and setting $\gamma_y$=G1 sin θ2 and $\gamma_z$=G1 cos θ2 in Equations (6) and (7), Equations (1) and (2) above can be obtained. Specifically, the coordinate conversion processing unit can convert the Y-axis angular velocity $\omega_y$ and the Z-axis angular velocity $\omega_z$ to the U-axis angular velocity $\omega_u$, and $\omega_v$, respectively, by executing the computations according to Equations (1) and (2).

The input device according to another aspect of the present invention further includes a physical quantity/displacement amount conversion unit configured to convert an angular velocity signal outputted from the coordinate conversion processing unit to a displacement amount signal for specifying an amount of displacement of a control object so that the input device is used for inputting information for determining a displacement direction and a displacement amount of a control object to a data processing device.

The angular velocity signal detected by the motion sensor unit provided to the input device can be transmitted in an unaltered form as a control signal or the like to a data processing device. However, in this case, the data processing device must compute a displacement amount for a control object (e.g., cursor pointer) in a display unit based on the received angular velocity signal, and the load on the data processing device is correspondingly increased.

Therefore, in the present aspect, a physical quantity/displacement amount conversion unit is provided to the input device, and the angular velocity signal is converted at the input device to a displacement amount for a control object (e.g., cursor pointer) in the display unit. Information (displacement amount signal) relating to the obtained displacement amount is then transmitted to a data processing device. The processing load on the data processing device is thereby reduced.

The input device according to another aspect of the present invention further includes a conversion processing unit configured to disable signal output from the input device when the pointing direction of the main body is substantially straight upward or substantially straight downward.

When the main body (housing) of the input device is oriented substantially straight upward or substantially straight downward, the angle θ1 between the vertical axis (G-axis) and the first plane is substantially 90°. Consequently, the component G1 (=G cos θ1) of the gravitational acceleration (straight upward) G that is in the V-axis, which is the perpendicular axis in the first plane, is cos 90=0, and is therefore substantially 0. The Y-axis acceleration ($\gamma_y$=G1 sin θ2) and the Z-axis acceleration ($\gamma_z$=G1 cos θ2) are thus also substantially 0. The denominators in Equations (1) and (2) above are thus substantially 0, and computation for coordinate conversion is impossible.

In reality, since the pointing direction (point direction) of the main body (housing) is toward the screen page or screen, and is very substantially horizontal, there may be no problem, but because the pointing direction of the main body may be substantially straight upward or straight downward in rare cases, several measures are preferably put in place.

Therefore, when the pointing direction (point direction) of the distal end of the main body (housing) is substantially straight upward or straight downward, a method is employed for keeping the signal output from the input device at zero (i.e., disabling the output of signals corresponding to the movement of the main body). The processing load (load that accompanies response processing) in the data processing device is thereby reduced.

In the input device according to another aspect of the present invention, the coordinate conversion unit is configured to halt the coordinate conversion processing and to output a Y-axis angular velocity signal and a Z-axis angular velocity signal obtained at a timing prior to the coordinate conversion processing when the pointing direction of the main body is substantially straight upward or substantially straight downward.

In the present aspect, when the pointing direction of the main body is substantially straight upward or substantially straight downward, the coordinate conversion processing unit does not execute coordinate conversion processing, and the Y-axis angular velocity signal and Z-axis angular velocity signal prior to coordinate conversion processing are each be outputted in an unaltered form. In the present aspect, the data processing device can control the position of a control object (e.g., a cursor pointer) in the display unit, for example, based on the received Y-axis angular velocity signal and Z-axis angular velocity signal.

The input device according to another aspect of the present invention further includes an operating unit configured and arranged to switch between enabling and disabling signal output from the input device.

In the present aspect, the input device is further provided with an operating unit (e.g., a press-type output enable switch) for switching between enabling and disabling signal output from the input device. Signals are outputted from the input device only when the user is operating the operating unit (e.g., only when the user is pressing the output enable switch). Consequently, during periods in which the operating unit is not being operated (e.g., periods in which the output enable switch is not pressed), even when the main body (housing) is moved, there is no positional displacement of the control object. Through the present aspect, movement of the control object not intended by the user can be reliably prevented, and the convenience of the three-dimensional input device is further enhanced.

The input device according to another aspect of the present invention further includes a communication unit configured and arranged to communicate with an external device.

Providing a communication unit to the input device makes it possible for signals to be transmitted from the input device to a data processing device or the like by wireless communication (including optical communication) or wired communication.

A data processing system according to another aspect of the present invention includes the input device according to any of the aspects described above; and a data processing device configured and arranged to receive a transmission signal of the input device and executing prescribed data processing based on the received signal.

Through the use of at least one of the aspects of the present invention described above, the convenience of a three-dimensional input device is enhanced. The use of three-dimensional space is becoming increasingly common in three-dimensional CAD, games, and the like on computers, and there is thus an increasing need for a highly convenient system that utilizes a three-dimensional input device capable of inputting three-dimensional movement. Through the present aspect, a data processing system can be provided that utilizes a small-sized three-dimensional input device having excellent operating properties.

BRIEF DESCRIPTION OF THE DRAWINGS

Referring now to the attached drawings which form a part of this original disclosure:

FIGS. 2(A) through 2(C) are views showing an orthogonal coordinate system defined in three-dimensional space, and detection of movement in the orthogonal coordinate system;

FIGS. 3(A) through 3(C) are views used to describe angular velocity detection error due to rotation about the X-axis of the input device;

FIGS. 4(A) and 4(B) are views showing a physical quantity measurement device mounted in the input device;

FIG. 5 is a view showing the details of coordinate conversion (rotation coordinate conversion);

FIGS. 6(A) through 6(E) are views showing the information and the like necessary for coordinate conversion;

FIG. 7 is a view showing the information and the like necessary for coordinate conversion;

FIG. 9 is a flow diagram showing the sequence of operations by the three-dimensional input device shown in FIG. 8.

DETAILED DESCRIPTION OF EXEMPLARY EMBODIMENTS

Figure 1:
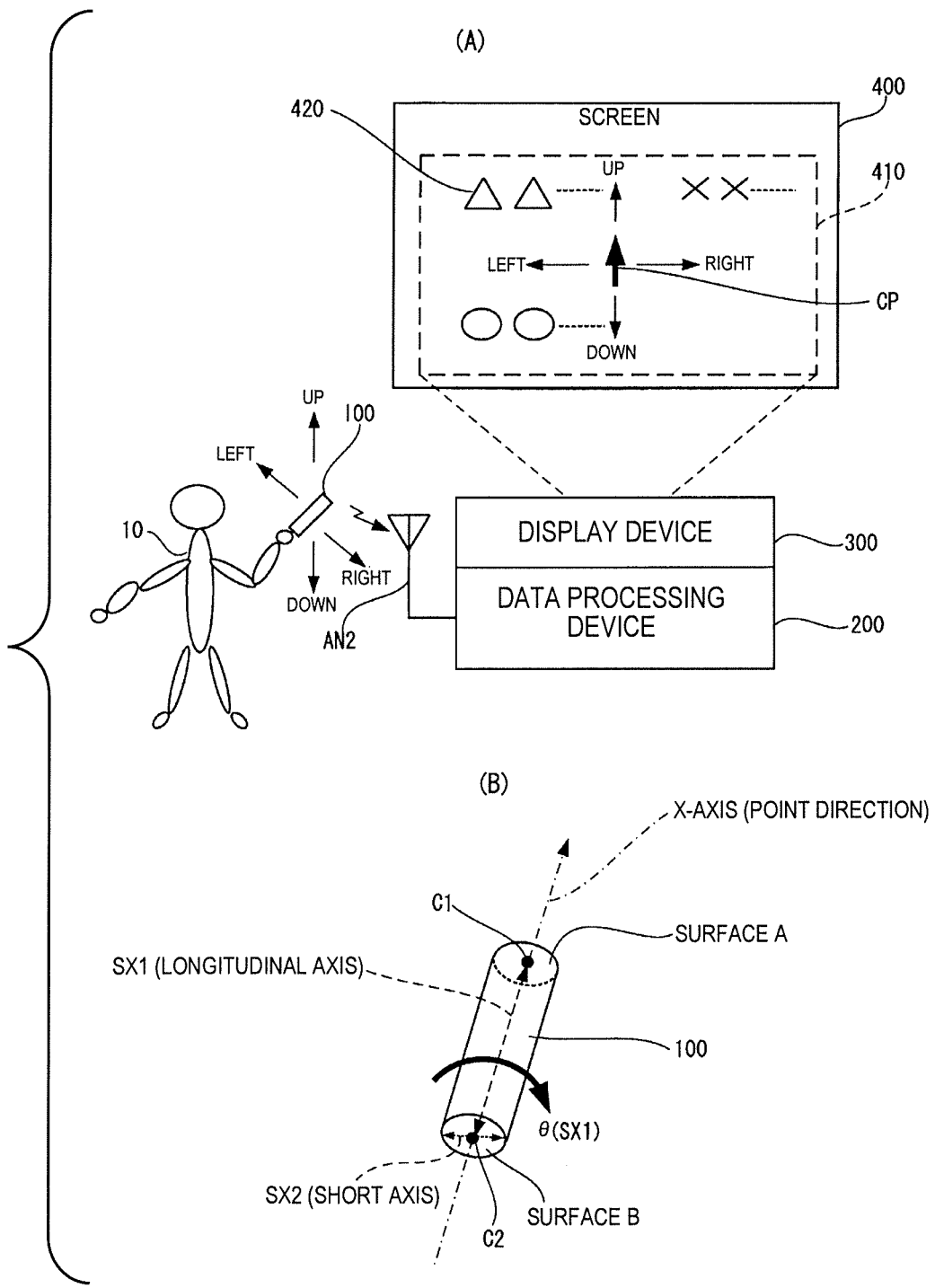
FIGS. 1(A) and 1(B) are views showing an example of the configuration of a data processing system that utilizes an input device.

Embodiments of the present invention will next be described with reference to the drawings. The embodiments described hereinafter do not limit the scope of the present invention described in the claims, and the configurations described in the embodiments are not necessarily essential as means of achieving the objects of the present invention.

First Embodiment

Example of Use of Three-Dimensional Input Device

FIGS. 1(A) and 1(B) are views showing an example of the configuration of a data processing system that utilizes an input device (in this instance, a three-dimensional input device is a pointing device that can be used instead of a laser pointer, for example). As shown in FIG. 1(A), a user 10 holds an input device 100 in his right hand, and the distal end part of the main body (housing) of the input device 100 points to a cursor pointer (sometimes referred to hereinafter simply as a pointer) CP displayed on a screen 400. In the following description, the direction in which the main body (housing) of the input device 100 points is referred to as the "pointing direction" or the "point direction." The point direction (pointing direction) is the "direction in which the distal end of the main body (housing) of the input device 100 points in space," and the point direction (pointing direction) coincides with the X-axis direction as defined in space. When the input device 100 is actually being used, the point direction (pointing direction, X-axis direction) can be treated as coinciding with the longitudinal direction of the main body (housing) of the input device 100 for the sake of convenience.

Specifically, as shown in FIG. 1(B), the input device 100 has the external appearance of a cylindrical column (cylinder shape), for example. The main body (housing) of the input device 100 has a longitudinal axis (long axis) SX1 and a short axis SX2 (axis orthogonal to the longitudinal axis SX1 and shorter than the longitudinal axis). The term "longitudinal direction" refers to the "direction in which the main body (housing) of the input device 100 extends generally linearly (direction of linear extension)." In FIG. 1(B), a line segment is assumed that connects a center point C2 of a bottom surface B and a center point C1 of a top surface A of the cylindrical main body (housing) of the input device 100, and the axis that coincides with the line segment is the longitudinal axis SX1. The top surface A or bottom surface B can also be viewed as a vertical cross-section of the housing, and the "axis that coincides with the longitudinal direction and coincides with a normal line at the center point of a vertical cross-section of the housing" can be designated as the longitudinal axis SX1. The "point direction" is determined by the orientation of the main body (housing) in space, and is conceptually distinct from the longitudinal axis (axis determined by the shape of the main body (housing) of the input device 100). However, when spatial coordinates are used as a reference, the result is considered to be that the "longitudinal direction of the main body (housing)" and the "point direction (pointing direction) of the main body (housing)" coincide. Consequently, the expressions "point direction axis (pointing direction axis)," "X-axis," and "longitudinal axis" can be treated as ultimately coinciding with each other.

The input device 100 houses a wireless communication unit (or a wired communication unit), for example, and as shown in FIG. 1(A), a signal that corresponds to movement of the input device 100 in three-dimensional space can be transmitted to a data processing device 200 by wireless communication (or wired communication). The data processing device 200 receives a signal transmitted from the input device 100 through the use of an antenna AN2 and executes prescribed data processing. A display device (display unit) 300 displays images or characters (reference numeral 420) and a cursor pointer CP on a screen 400, for example, based on the results of data processing. It is also possible for images or characters and a cursor pointer or the like to be displayed in a display rather than on a screen. When the distal end of the main body (housing) of the input device 100 is waved vertically or horizontally, for example, by the user 10, the cursor pointer CP displayed on the screen 400 moves vertically or horizontally according to the movement of the main body (housing, for example). Consequently, the input device 100 shown in FIG. 1 can be used as a substitute for a laser pointer, for example.

Movement Detection and Orthogonal Coordinate System Defined in Three-Dimensional Space FIGS. 2(A) through 2(C) are views showing an orthogonal coordinate system defined in three-dimensional space, and detection of movement in the orthogonal coordinate system. As shown in FIG. 2(A), an X-axis is defined that coincides with the pointing direction (point direction) of the main body (housing) of the input device 100, and a two-dimensional first orthogonal coordinate system is defined by a Y-axis and Z-axis orthogonal to each other in a Q-plane that is a first plane perpendicular to the X-axis. The X-axis is a first detection axis, and the Y-axis is a second detection axis. Consequently, the input device 100 detects movement of the main body (housing) in three-dimensional space based on the two-dimensional first orthogonal coordinate system defined by the Y-axis and the Z-axis. When the spatial orientation of the main body (housing) of the input device 100 is specified, the first orthogonal coordinate system is uniquely defined. The first orthogonal coordinate system is not a fixed coordinate system, and as indicated by the dashed line in FIG. 2(A), when the main body (housing) of the input device 100 is rotated an amount $\theta(X)$ about the X-axis, the Y-axis and Z-axis accordingly rotate by the amount $\theta(X)$. In this arrangement, $\theta(X)$ indicates the angle of rotation about the X-axis as the rotational axis.

As shown in FIG. 2(B), slight vertical (perpendicular direction) movement of the main body (housing) of the input device 100 can be detected as rotation (rotation angle $\theta(Y)$) about the Y-axis as the rotational axis. In FIG. 2(B), the main body (housing) of the input device 100 is drawn in a rectangular column shape for the sake of convenience. This rectangular column shape can be viewed as indicating the internal wall surfaces of the housing in which the motion sensor (angular velocity sensor or the like) is attached, for example. Consequently, information relating to the rotation angle $\theta(Y)$ about the Y-axis can be obtained by detecting the angular velocity of rotation about the Y-axis through the use of the Y-axis angular velocity sensor, and integrating the angular velocity over time. In other words, vertical movement of the main body (housing) of the input device 100 can be detected.

As shown in FIG. 2(C), slight horizontal (horizontal direction) movement of the main body (housing) of the input device 100 can be detected as rotation (rotation angle $\theta(Z)$) about the Z-axis as the rotational axis. Consequently, information relating to the rotation angle $\theta(Z)$ about the Z-axis can be obtained by detecting the angular velocity of rotation about the Z-axis through the use of the Z-axis angular velocity sensor, and integrating the angular velocity over time. In other words, horizontal movement of the main body (housing) of the input device 100 can be detected.

FIGS. 3(A) through 3(C) are views used to describe angular velocity detection error due to rotation about the X-axis of the input device. As shown in FIG. 3(A), a state is supposed in which the right distal end of the main body (housing) of the input device 100 is oriented (pointed) upward and to the right. FIG. 3(B) shows a cross-section along line S-S' in FIG. 3(A) in a state in which the main body (housing) of the input device 100 is not rotated about the X-axis. FIG. 3(C) shows the cross-section along line S-S' in FIG. 3(A) in a state in which the main body (housing) of the input device 100 is rotated an amount $\theta 2$ about the X-axis.

As shown in FIGS. 3(B) and 3(C), the cross-section of the internal wall surfaces of the main body (housing) of the input device 100 is substantially square shaped. The four surfaces constituting the internal wall surfaces (or the edges constituting the cross-sectional shape of the internal wall surfaces) are designated P1 through P4. The two gyroscopes (angular velocity sensors) 102, 104 detect the angular velocity of rotation about the Y-axis and the Z-axis (i.e., the detection axes), respectively. The gyroscopes 102, 104 are fixed to the internal wall surfaces P3 and P2, respectively, of the main body (housing) of the input device 100. Thus, as shown in FIG. 3(C), when the main body (housing) of the input device 100 rotates an amount $\theta 2$ about the axis (X-axis) other than the detection axes (Y-axis, Z-axis), the Y-axis and Z-axis also rotate, and the position of each gyroscope (angular velocity sensor) varies as a result.

Consequently, even though the same movement (in this case, left and right movement QR, QL, respectively) occurs at the distal end of the main body (housing) of the input device 100, a difference occurs between the angular velocity detected in a state in which there is no rotation about the X-axis (the state shown in FIG. 3(B)) and the angular velocity detected in a state in which there is rotation about the X-axis (the state shown in FIG. 3(C)). Specifically, a detection error occurs due to rotation of the main body (housing) of the input device 100 about the axis (X-axis) other than the detection axes (Y-axis, Z-axis).

Rotation of the main body (housing) about the axis (X-axis) other than the detection axes (Y-axis, Z-axis) preferably does not occur, and in order to prevent such rotation, the user must constantly be aware so as not to rotate the main body of the input device 100. In this case, the operating properties of the input device are adversely affected. Particularly when a button, touch sensor, or the like (not shown in FIG. 3) that is necessary for operation is provided to the main body of the input device 100, the limitation described above makes it impossible for the user to hold the device in a manner that enables easy operation, and the user is forced to hold the device in an inconvenient manner. This drawback places a burden on the user. As the user holds and operates the main body of the input device 100, some unwanted and unintentional rotation is unavoidable during actual use.

A configuration is therefore adopted in the present embodiment whereby the detected angular velocities (angular velocities for the Y-axis and Z-axis) are corrected (specifically, coordinate-converted) so as to be unaffected by rotation of the housing about the X-axis, and so that the correct angular velocity can always be detected. The manner in which the user holds the main body (housing) is thereby unrestricted, and the operating properties of the three-dimensional input device are improved. Information relating to the rotation angle about the X-axis must be obtained in order to execute coordinate conversion, and in order to obtain this information, the input device of the present embodiment is provided with acceleration sensors for detecting acceleration about the Y-axis and acceleration about the Z-axis.

Physical Quantity Measurement Device Mounted in Three-Dimensional Input Device

FIGS. 4(A) and 4(B) are views showing a physical quantity measurement device mounted in the input device. FIG. 4(A) shows a state in which there is no rotation of the housing about the X-axis, and FIG. 4(B) shows a state in which there is rotation (rotation angle $\theta 2$) of the housing about the X-axis.

The input device 100 has a Y-axis gyroscope 102 for detecting the angular velocity $\omega y$ of rotation about the Y-axis, a Z-axis gyroscope 104 for detecting the angular velocity ωz of rotation about the Z-axis, a Y-axis acceleration sensor 106 for detecting acceleration in the Y-axis direction, and a Z-axis acceleration sensor 108 for detecting acceleration in the Z-axis direction. The Y-axis gyroscope 102 and Z-axis gyroscope 104 each output a positive value for the angular velocity in the directions indicated by arrows for each axis (counterclockwise direction in FIGS. 4(A) and 4(B)), and the Y-axis acceleration sensor 106 and Z-axis acceleration sensor 108 each output a positive value for the acceleration in the directions indicated by the arrows for each axis.

In FIG. 4(B), the user has changed the manner of holding the main body (housing) of the input device 100, and the Y-axis and Z-axis are therefore rotated θ2 about the X-axis. Since there is no change in the direction (point direction: X-axis direction) in which the user wishes to point even though the user is holding the main body (housing) in a different manner, the position of the X-axis is unchanged.

A measurement error is included in the Y-axis angular velocity and Z-axis angular velocity detected in the state shown in FIG. 4(B). Therefore, processing is executed in the present embodiment for converting (correcting) the detected angular velocities into angular velocities of the state shown in FIG. 4(A). Specifically, coordinate conversion processing is executed. The second orthogonal coordinate system shown indicating the state of FIG. 4(A) (in which there is no rotation about the X-axis) must be defined for coordinate conversion.

A second orthogonal coordinate system in three-dimensional space is defined by the X-axis that coincides with the pointing direction of the main body (housing) of the input device 100, a U-axis as the horizontal axis in a Q-plane perpendicular to the X-axis, and a V-axis as an axis perpendicular to the U-axis in the Q-plane. The U-axis is the horizontal axis in the first plane, and the V-axis is the vertical axis orthogonal to the U-axis in the first plane. The U-axis and the V-axis are each uniquely defined by specifying the pointing direction (point direction) of the main body (housing) of the input device 100, and are not affected by rotation of the input device 100 about the X-axis.

In the present embodiment, the coordinate conversion processing unit (indicated by reference numeral 532 in FIGS. 5 and 8) executes coordinate conversion (rotation coordinate conversion) from the first orthogonal coordinate system to the second orthogonal coordinate system, and the Y-axis angular velocity ωy detected by the Y-axis gyroscope 102, and the Z-axis angular velocity ωz detected by the Z-axis gyroscope 104 are converted to a U-axis angular velocity ωu and a V-axis angular velocity ωv, respectively. The detected angular velocities (including the measurement error that accompanies rotation when rotation about the X-axis occurs) are thereby converted to angular velocities for a state in which there is no rotation of the main body (housing) of the input device 100 about the X-axis.

Coordinate Conversion Processing

The input device 100 is provided with the coordinate conversion processing unit (indicated by reference numeral 532 in FIGS. 5 and 8), and the coordinate conversion processing unit 532 executes coordinate conversion processing. The coordinate conversion processing will be described using FIGS. 5 through 7.

FIG. 5 is a view showing the details of coordinate conversion (rotation coordinate conversion). FIGS. 6(A) through 6(E) and 7 are views showing the information necessary for coordinate conversion. Coordinate conversion is generally performed by a combination of parallel movement and rotation. In the present embodiment, it is sufficient if only rotation about the X-axis is considered. Rotation coordinate conversion can be performed through the use of a matrix operation.

In this case, the coordinate conversion processing unit 532 converts the Y-axis angular velocity $\omega_y$ and the Z-axis angular velocity $\omega_z$ to a U-axis angular velocity $\omega_u$ and $\omega_v$, respectively, by computation according to Equation (1) and Equation (2) below, wherein $\gamma_y$ is the Y-axis acceleration, $\gamma_z$ is the Z-axis acceleration, $\omega_y$ is the Y-axis angular velocity, and $\omega_z$ is the Z-axis acceleration.

Equations (1) and (2)

$$\omega_u = \frac{\omega_y \gamma_z - \omega_z \gamma_y}{\sqrt{\gamma_y^2 + \gamma_z^2}} \quad (1)$$

$$\omega_v = \frac{\omega_y \gamma_y + \omega_z \gamma_z}{\sqrt{\gamma_y^2 + \gamma_z^2}} \quad (2)$$

The sequence is described below. When the angle formed by the Y-axis (Z-axis) and the U-axis (V-axis) in the Q-plane (see FIG. 2(A)) perpendicular to the X-axis is designated as θ2, the matrix operation according to Equation (3) below may be performed in order to convert the Y-axis angular velocity $\omega_y$ and the Z-axis angular velocity $\omega_z$ to the U-axis angular velocity $\omega_u$ and $\omega_v$, respectively. Equation (4) and Equation (5) below are thus established.

Equations (3) to (5)

$$\begin{pmatrix} \omega_u \\ \omega_v \end{pmatrix} = \begin{pmatrix} \cos\theta 2 & -\sin\theta 2 \\ \sin\theta 2 & \cos\theta 2 \end{pmatrix} \begin{pmatrix} \omega_y \\ \omega_z \end{pmatrix} \quad (3)$$

$$\omega_u = \omega_y \cos\theta 2 - \omega_z \sin\theta 2 \quad (4)$$

$$\omega_v = \omega_y \sin\theta 2 + \omega_z \cos\theta 2 \quad (5)$$

The coordinate conversion processing unit 532 shown in FIG. 5 executes the computations shown in Equations (4) and (5) above. However, sin θ2 and cos θ2 must be known in order to execute the computations shown in Equations (4) and (5) above, and the Y-axis acceleration sensor 106 and the Z-axis acceleration sensor 108 are therefore provided for this purpose in the present embodiment.

Gravitational acceleration will be described with reference to FIGS. 6(A) through 6(E). As shown in FIG. 6(A), gravitational acceleration (in the direction straight upward) is designated as G. When the angle θ1 is formed by the vertical axis (G-axis) and the first plane, the component of the gravitational acceleration (straight upward) G that is in the V-axis (which coincides with the Z-axis in a state in which there is no rotation about the X-axis), which is the perpendicular axis in the first plane, is designated as G1 (=G cos θ1).

As shown in FIG. 6(B), the Y-axis acceleration sensor 106 is provided to the internal wall surface P4 of the main body (housing), and the Z-axis acceleration sensor 108 is provided to the internal wall surface P1 of the main body (housing). FIG. 6(B) shows a state in which there is no rotation about the X-axis of the main body (housing). FIG. 6(C) shows the position of the vector G1 in the VU plane, and corresponds to FIG. 6(B). A case is assumed herein in which the main body (housing) of the input device 100 is rotated an amount θ2 about the X-axis, and the Z-axis (Y-axis) and V-axis (U-axis) form the rotation angle θ2 in the Q-plane as the first plane orthogonal to the X-axis.

FIG. 6(D) shows a state in which the main body (housing) is rotated (rotation angle θ2) about the X-axis. FIG. 6(E) shows the position of the vector G1 in the XY plane, and corresponds to FIG. 6(D). In FIG. 6(E), the vector G1 can be decomposed into a Z-axis component and a Y-axis component (both of which are indicated by thick dashed lines in the drawing). Specifically, the Z-axis component of the gravitational acceleration G (i.e., the Z-axis acceleration $\gamma_z$) is G1 cos θ2, and in the same manner, the Y-axis component of the gravitational acceleration G (straight upward) (i.e., the Y-axis acceleration $\gamma_y$) is G1 sin θ2. As is apparent, the Y-axis acceleration $\gamma_y$ and the Z-axis acceleration $\gamma_z$ include the information of the rotation angle θ2 about the X-axis. Consequently, the computations according to Equations (4) and (5) above can be executed by detecting the Z-axis acceleration $\gamma_z$ and the Y-axis acceleration $\gamma_y$. Specifically, Equations (4) and (5) can be transformed into Equations (6) and (7), respectively. Moreover, G1 can be indicated as shown in Equation (8) below.

Equations (6) to (8)

$$\omega_u = \frac{\omega_y G1\cos\theta2 - \omega_Z G1\sin\theta2}{G1} \quad (6)$$

$$\omega_v = \frac{\omega_y G1\sin\theta2 + \omega_Z G1\cos\theta2}{G1} \quad (7)$$

$$G1 = \sqrt{G1^2(\sin^2\theta + \cos^2\theta)} = \sqrt{\gamma_y^2 + \gamma_z^2} \quad (8)$$

By substituting Equation (8) into the denominators of Equations (6) and (7), and setting $\gamma_y$=G1 sin θ2 and $\gamma_z$=G1 cos θ2 in Equations (6) and (7), Equations (1) and (2) above can be obtained. Specifically, the coordinate conversion processing unit 532 can convert the Y-axis angular velocity $\omega_y$ and the Z-axis angular velocity $\omega_z$ to the U-axis angular velocity $\omega_u$ and $\omega_v$, respectively, by executing the computations according to Equations (1) and (2).

FIG. 7 is a view showing the interrelationships of ωy, ωz, ωu, ωv, γy, and γz. As described above, the Y-axis angular velocity ωy and the Z-axis angular velocity ωz are detected by the Y-axis gyroscope 102 and the Z-axis gyroscope 104, respectively. The Y-axis acceleration γy and the Z-axis acceleration γz are detected by the Y-axis acceleration sensor 106 and the Z-axis acceleration sensor 108, respectively. The U-axis angular velocity ωu and the V-axis angular velocity ωv are calculated by the coordinate conversion described above.

Through the present embodiment, rotation about the detection axis (i.e., the Y-axis or Z-axis) can be detected with high precision regardless of the manner in which the main body (housing) of the input device 100 is held by the user. Consequently, an input device (e.g., three-dimensional pointing device, three-dimensional mouse, or the like) can be provided that has more similar operating properties to a pointing rod or laser pointer, for example.

Measures Taken when Point Direction is Substantially Straight Upward or Substantially Straight Downward When the main body (housing) of the input device 100 is oriented substantially straight upward or substantially straight downward, the angle θ1 between the vertical axis (G-axis) and the Q-plane (see FIG. 2(A)) is substantially 90°. Consequently, the component of the gravitational acceleration (straight upward) G that is in the V-axis, which is the perpendicular axis in the Q-plane perpendicular to the X-axis, is cos 90=0, and is therefore substantially 0. The Y-axis acceleration ($\gamma_y$=G1 sin θ2) and the Z-axis acceleration ($\gamma_z$=G1 cos θ2) are thus also substantially 0. The denominators in Equations (1) and (2) above are thus substantially 0, and computation for coordinate conversion is impossible.

In reality, since the pointing direction (point direction) of the main body (housing) is toward the screen page or screen, and is very substantially horizontal, there may be no problem, but because the pointing direction of the main body of the input device 100 may be substantially straight upward or straight downward in rare cases, several measures are preferably put in place.

Therefore, when the pointing direction (point direction) of the distal end of the main body (housing) is substantially straight upward or straight downward, for example, a method is employed for keeping the signal output from the input device 100 at zero (i.e., disabling the output of signals corresponding to the movement of the main body). The processing load (load that accompanies response processing) in the data processing device (the side that receives signals from the input device 100) is thereby reduced.

When the pointing direction of the main body is substantially straight upward or substantially straight downward, for example, coordinate conversion processing by the coordinate conversion processing unit 532 is stopped, and the Y-axis angular velocity signal and Z-axis angular velocity signal prior to coordinate conversion processing may each be outputted in an unaltered form. In this case, an advantage is gained in that the data processing device (the side that receives signals from the input device 100) can control the position of a control object (e.g., a cursor pointer) in the display unit, for example, based on the received Y-axis angular velocity signal and Z-axis angular velocity signal.

Example of Structure of System that Utilizes Three-Dimensional Input Device

Figure 8:
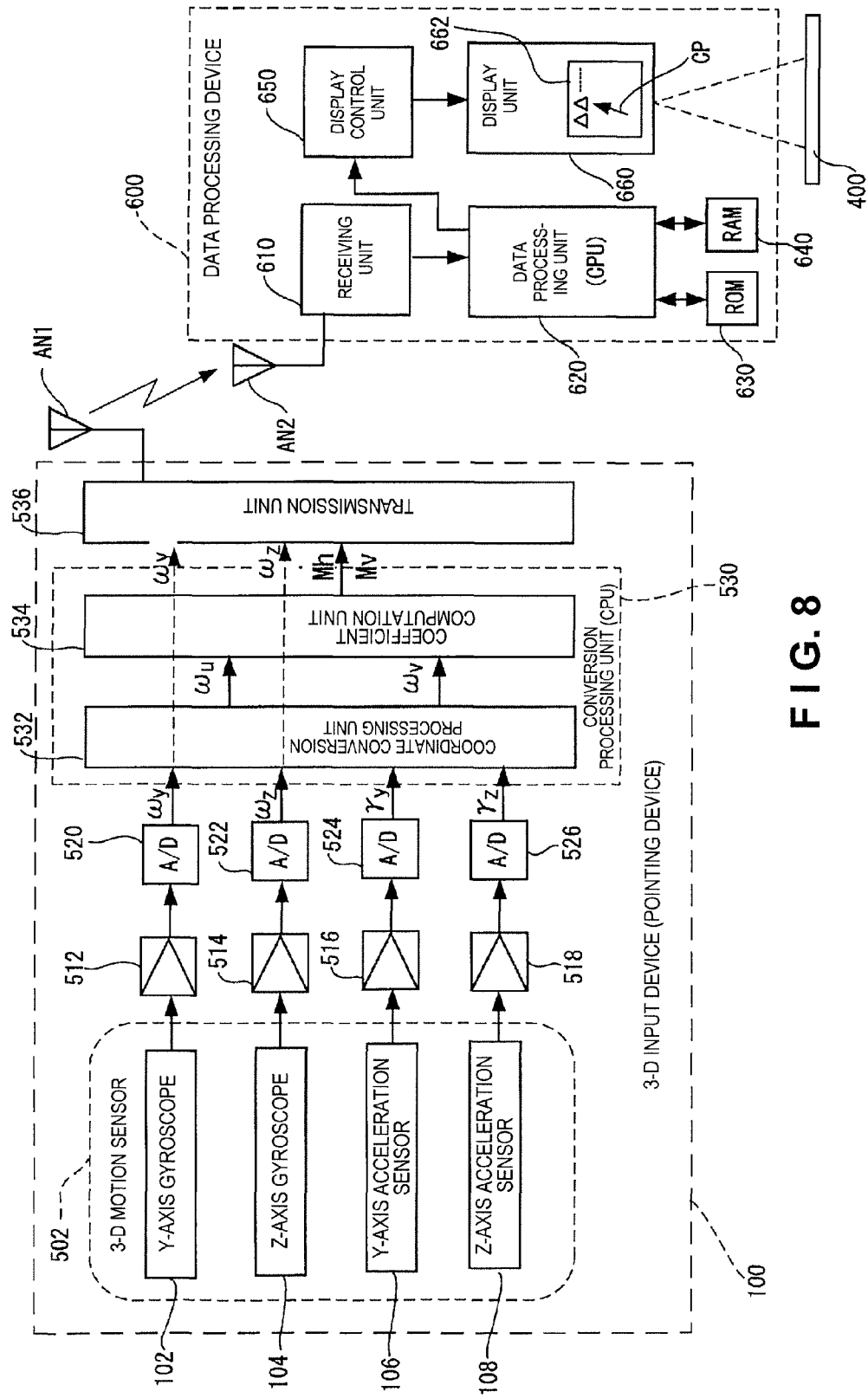
FIG. 8 is a view showing an example of the structure of a data processing system that utilizes a three-dimensional input device.

FIG. 8 is a view showing an example of the structure of a data processing system that utilizes a three-dimensional input device. The three-dimensional input device 100 (in this instance, a pointing device) has a motion sensor unit (three-dimensional motion sensor unit) 502. The motion sensor unit 502 has the Y-axis gyroscope 102, the Z-axis gyroscope 104, the Y-axis acceleration sensor 106, and the Z-axis acceleration sensor 108.

The three-dimensional input device (pointing device) 100 furthermore has amplifiers 512 through 518 for amplifying the output signals of the sensors 102 through 108; A/D converters 520 through 526; a conversion processing unit (e.g., CPU) 530; a wireless transmission unit 536; and an antenna AN1. The conversion processing unit 530 has the coordinate conversion processing unit 532 and a coefficient computation unit (physical quantity/displacement amount conversion unit) 534. The coefficient computation unit (physical quantity/displacement amount conversion unit) 534 may also be omitted. In this case, angular velocity signals (ωu, ωv) after coordinate conversion are outputted.

The data processing device 600 has an antenna AN2, a receiving unit 610, a data processing unit (e.g., CPU) 620, ROM 630, RAM 640, a display control unit 650, and a display unit 660. The display unit 660 may have a display 662. When the display unit 660 is a projection-type display device, an image is displayed on the screen 400, for example.

The three-dimensional input device (pointing device) 100 shown in FIG. 8 can be used for inputting information for determining the displacement direction and displacement amount of a control object (e.g., cursor pointer) to the data processing device 600. The coefficient computation unit 534 provided as a physical quantity/displacement amount conversion unit to the input device 100 multiplies the angular velocity signal outputted from the coordinate conversion processing unit 532 by a coefficient (conversion coefficient), and converts the angular velocity signal to a displacement amount signal for specifying the displacement amount of the control object (cursor pointer CP or the like). Specifically, the angular velocity signals ωu, ωv after coordinate conversion are converted to displacement amount signals Mh, Mv, respectively (wherein Mh is the amount of displacement in the horizontal direction, and Mv is the amount of displacement in the vertical direction).

The angular velocity signals detected by the motion sensor unit 502 provided to the input device 100 can be transmitted in an unaltered form as control signals or the like to the data processing device. However, in this case, the data processing device 600 must compute the displacement amount of the control object (e.g., cursor pointer CP) in the display unit 660 based on the received angular velocity signals, and the load on the data processing device 600 is correspondingly increased. Therefore, in FIG. 8, the coefficient computation unit 534 as a physical quantity/displacement amount conversion unit is provided to the input device 100, and the angular velocity signals are converted to displacement amounts of the control object (e.g., cursor pointer CP) in the display unit 660. The obtained displacement amount information (displacement amount signals) Mh, Mv are each transmitted to the data processing device 600 by wireless communication (this configuration is not limiting, and optical communication or wired communication may also be used). The processing load on the data processing device 600 is thereby reduced.

When the pointing direction (point direction) of the distal end of the main body (housing) is substantially straight upward or straight downward, the coordinate conversion processing unit 532 disables outputting of signals corresponding to the movement of the main body, or stops coordinate conversion processing and outputs the Y-axis angular velocity ωy and Z-axis angular velocity ωz that were in effect prior to coordinate conversion processing. A substantially straight upward or straight downward orientation of the pointing direction (point direction) of the distal end of the main body (housing) can be detected by comparing the denominators of Equations (1) and (2) above to a predetermined threshold value, for example. Specifically, the point direction can be determined to be substantially straight upward or substantially straight downward when the denominator is smaller than the threshold value.

The data processing unit 620 of the data processing device 600 performs a prescribed data processing based on the signal received by the receiving unit 610, and generates data or a timing control signal for image display, for example. The display control unit 650 controls image display in the display unit 660.

In the data processing system shown in FIG. 8, the transmission unit 536 is provided to the input device, and physical quantity signals can be freely transmitted to the data processing device and other components from the input device 100 by wireless communication (including optical communication). The convenience of the input device is thereby enhanced. The input device 100 also can output signals by wired communication.

Through the present embodiment, a data processing system can be provided that utilizes a small-sized three-dimensional input device having excellent operating properties.

FIG. 9 is a flowchart showing a control algorithm for the processing executed by the three-dimensional input device shown in FIG. 8. The coordinate conversion processing unit 532 acquires acceleration data γy, γz (step S700) and acquires angular velocity data ωy, ωz (step S701).

Then, γyωy−γyωz gives Su (step S702), γyωy+γzωz gives Sv (step S703), the denominators of Equations (1) and (2) above give k (step S704), and kSu gives ωu and kSv gives ωv (step S705). The angular velocity ωu of rotation about the U-axis, and the angular velocity ωv of rotation about the V-axis are thereby obtained.

The physical quantity/displacement amount conversion unit (coefficient computation unit) 534 then multiplies ωv by the coefficient βyv to compute a horizontal displacement amount MH (step S706), multiplies ωu by the coefficient βzu to compute a vertical displacement amount MV (step S707), and computes Mh, Mv by integer conversion processing (step S708).

When the point direction of the main body (housing) of the input device 100 is substantially straight upward or substantially straight downward, the horizontal displacement amount and the vertical displacement amount are both 0. Thus, when Mh=0 and Mv=0, no signal is outputted from the input device 100, and processing is ended (step S709), and a horizontal displacement amount Mh and vertical displacement amount Mv are transmitted to the data processing device 600 (step S710) only when a determination of "No" has been made in step S709.

Second Embodiment

Figure 10:
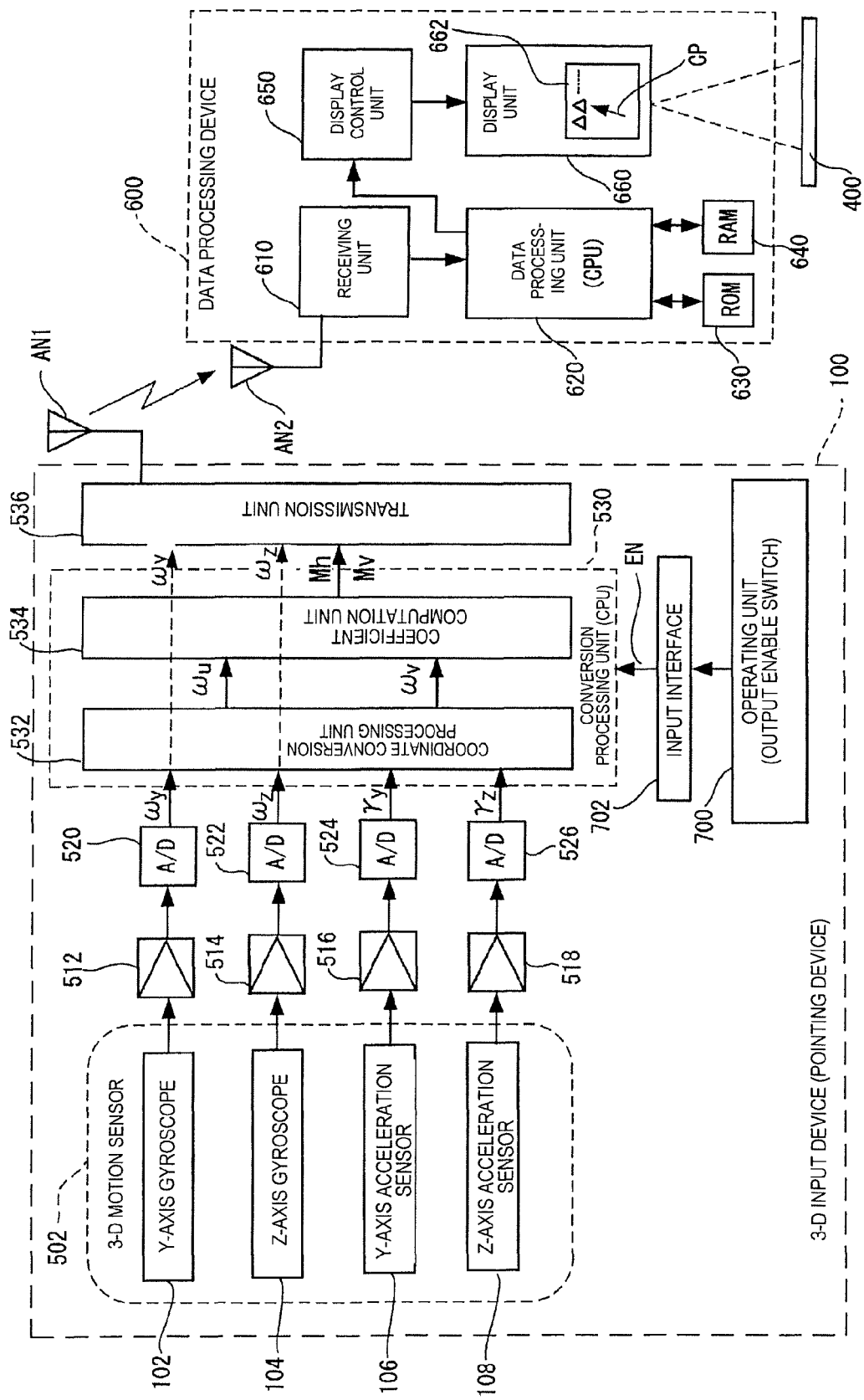
FIG. 10 is a view showing the configuration of another example of the input device.

FIG. 10 is a view showing the configuration of another example of the input device. In the input device 100 shown in FIG. 10, the operating unit (output enable switch) 700 and an input interface 702 are added to the configuration shown in FIG. 8. The operating unit (output enable switch) 700 functions as a mode switch for switching between enabling/disabling (enable/disable) signal output from the input device 100.

In the present embodiment, an enable signal EN is at an active level, and a signal is outputted from the input device 100 only when the operating unit 700 is being operated (e.g., only when the output enable switch is being pressed). Consequently, during periods in which the operating unit 700 is not being operated (e.g., periods in which the output enable switch is not pressed), even when the user moves the main body (housing) of the input device 100, there is no change in the position of the control object (e.g., cursor pointer CP) in the display unit 660 of the data processing device 600.

Through the present embodiment, it is possible to prevent the control object in the display unit from moving against the user's intention, and the convenience of the three-dimensional input device is further enhanced. Buttons or the like having the same function as the left/right click buttons of a mouse may also be added in order to provide functionality equivalent to that of a mouse, for example. In this case, the convenience of the input device 100 can be further enhanced.

The manner in which the user must hold the main body (housing) is limited in the conventional technique, but through the present embodiment, the input device can correctly detect vertical/horizontal movement (rotation) with respect to the point direction and output signals regardless of the manner in which the user holds the main body (housing). It is therefore possible to provide the user with an operating experience that is more similar to that of a more familiar instrument, such as a pointing rod or a laser pointer. The user can also hold the input device in a manner that allows easy operation of the accompanying button or the like.

As described above, through at least one embodiment of the present invention, rotation about a detection axis can be detected with high precision regardless of the manner in which the main body (housing) is held by the user. Consequently, an input device (e.g., three-dimensional pointing device, three-dimensional mouse, or the like) can be provided that has similar operating properties to a pointing rod or laser pointer, for example. A highly precise three-dimensional input device can also be provided.

The use of three-dimensional space is becoming increasingly common in three-dimensional CAD, games, and the like on computers, and there is thus an increasing need for a device capable of inputting three-dimensional movement. Through at least one embodiment of the present invention, a system can be provided that utilizes a small-sized three-dimensional input device having excellent operating properties that is capable of detecting motion with high precision.

The input device of the present embodiment is particularly useful in presentation or other settings in which a pointing rod, laser pointer, or the like has conventionally been used, but the utilization of the input device of the present embodiment is not limited to such settings. When the input device is used as an input device of a computer or the like, i.e., as a user interface, for example, the input device can be used for input in all the applications operated by the input device. The input device of the present embodiment can also be applied in a panning system for a remotely operated camera, a robotic control system, or various other systems.

Embodiments of the present invention are described in detail above, but it will be readily apparent to one skilled in the art that numerous modifications of the present invention are possible in a range that does not depart from the new matter and effects of the present invention. All such modifications are accordingly encompassed by the present invention. The term "input device" is interpreted in the broadest sense, and broadly encompasses input devices that are capable of inputting signals that correspond to spatial displacement. The configuration of the three-dimensional motion sensor is not limited by the embodiments described above, and other configurations may be adopted (for example, a configuration in which a magnetic sensor or the like is included in addition to a gyroscope and an acceleration sensor). The orientation and rotation of the input device, as well as translation of the input device are also included in spatial displacement. Translation (horizontal movement, vertical movement, or other movement) of the input device can be computed by integrating the variation of the output of an acceleration sensor over time.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An input device comprising:
a main body;
a motion sensor unit configured and arranged to generate a physical quantity signal corresponding to movement of the main body in a first two-dimensional orthogonal coordinate system defined by a mutually orthogonal Y-axis and Z-axis in a first plane perpendicular to an X-axis that coincides with a pointing direction of the main body,
the motion sensor unit including
a Y-axis angular velocity sensor configured and arranged to detect an angular velocity of the main body about the Y-axis,
a Z-axis angular velocity sensor configured and arranged to detect an angular velocity of the main body about the Z-axis,
a Y-axis acceleration sensor configured and arranged to detect an acceleration of the main body in a Y-axis direction, and
a Z-axis acceleration sensor configured and arranged to detect an acceleration of the main body in a Z-axis direction; and
a coordinate conversion processing unit configured to perform coordinate conversion processing based on the Y-axis acceleration detected by the Y-axis acceleration sensor and the Z-axis acceleration detected by the Z-axis acceleration sensor, the coordinate conversion processing unit being configured to convert the Y-axis angular velocity detected by the Y-axis angular velocity sensor and the Z-axis angular velocity detected by the Z-axis angular velocity sensor to a U-axis angular velocity and a V-axis angular velocity, respectively, in a second two-dimensional orthogonal coordinate system defined by a U-axis corresponding to a horizontal axis in the first plane and a V-axis perpendicular to the U-axis in the first plane.

2. The input device according to claim 1, wherein
the coordinate conversion processing unit is configured to convert the Y-axis angular velocity and the Z-axis angular velocity to the U-axis angular velocity and the V-axis angular velocity, respectively, according to Equations (1) and (2) below, $$\omega_u = \frac{\omega_y \gamma_z - \omega_z \gamma_y}{\sqrt{\gamma_y^2 + \gamma_z^2}} \quad (1)$$

$$\omega_v = \frac{\omega_y \gamma_y + \omega_z \gamma_z}{\sqrt{\gamma_y^2 + \gamma_z^2}} \quad (2)$$

wherein $\omega_u$ represents the U-axis angular velocity, $\omega_v$ represents the V-axis angular velocity, $\omega_y$ represents the Y-axis angular velocity, $\omega_z$ represents the Z-axis angular velocity, $\gamma_y$ represents the Y-axis acceleration, and $\gamma_z$ represents the Z-axis acceleration.

3. The input device according to claim 1, further comprising
a physical quantity/displacement amount conversion unit configured to convert an angular velocity signal outputted from the coordinate conversion processing unit to a displacement amount signal for specifying an amount of displacement of a control object so that the input device is used for inputting information for determining a displacement direction and a displacement amount of a control object to a data processing device.

4. The input device according to claim 1, further comprising
a conversion processing unit configured to disable signal output from the input device when the pointing direction of the main body is substantially straight upward or substantially straight downward.

5. The input device according to claim 1, wherein
the coordinate conversion unit is configured to halt the coordinate conversion processing and to output a Y-axis angular velocity signal and a Z-axis angular velocity signal obtained at a timing prior to the coordinate conversion processing when the pointing direction of the main body is substantially straight upward or substantially straight downward.

6. The input device according to claim 1, further comprising
an operating unit configured and arranged to switch between enabling and disabling signal output from the input device.

7. The input device according to claim 1, further comprising
a communication unit configured and arranged to communicate with an external device.

8. A data processing system comprising:
the input device according to claim 7; and
a data processing device configured and arranged to receive a transmission signal from the input device and to execute prescribed data processing based on the received signal.

\* \* \* \* \*